United States Patent [19]

Zumstein et al.

[11] Patent Number: 5,690,512
[45] Date of Patent: Nov. 25, 1997

[54] ELECTROTECHNICAL ARTICLE

[75] Inventors: Eduard Zumstein, Giswil; Heinz Amrein, Kriens, both of Switzerland

[73] Assignee: Schurter AG, Luzern, Switzerland

[21] Appl. No.: 670,228

[22] Filed: Jun. 21, 1996

[30] Foreign Application Priority Data

Jun. 28, 1995 [CH] Switzerland ............... 01890/95

[51] Int. Cl.$^6$ .................................................. H01R 13/73
[52] U.S. Cl. ................................................... 439/545
[58] Field of Search ............................. 439/607, 552, 439/554, 556, 545, 557

[56] References Cited

U.S. PATENT DOCUMENTS 3,109,124  10/1963  Sinninger ................. 439/607
3,277,234  10/1966  Dekko et al. ............. 439/552
3,899,101   8/1975  Keating et al. .

FOREIGN PATENT DOCUMENTS 1245245  3/1992  Germany.

Primary Examiner—Gary F. Paumen
Assistant Examiner—Christopher Goins
Attorney, Agent, or Firm—Laurence R. Brown

[57] ABSTRACT

An electrical module for carrying electrical components is plugged into an opening in the wall of electrical apparatus, preferably from the inside. Mounting grooves on either side of the module engage corresponding edges of the wall opening in response to lateral movement which overcomes elastically yielding structure on the groove bottom of one side comprises latching structure for stably affixing the module in place in the opening so that entry from the outside of the electrical apparatus is precluded.

6 Claims, 2 Drawing Sheets

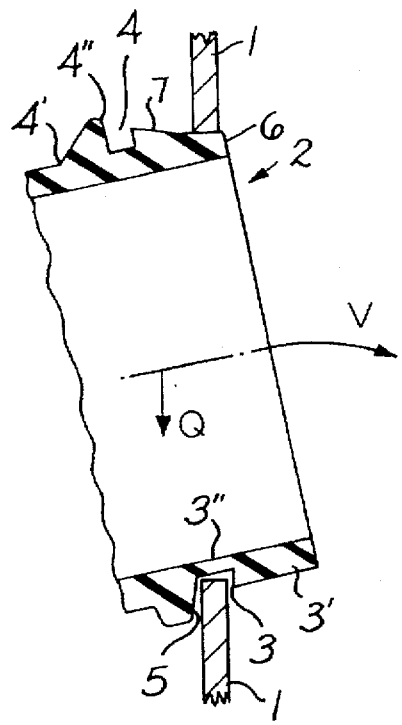
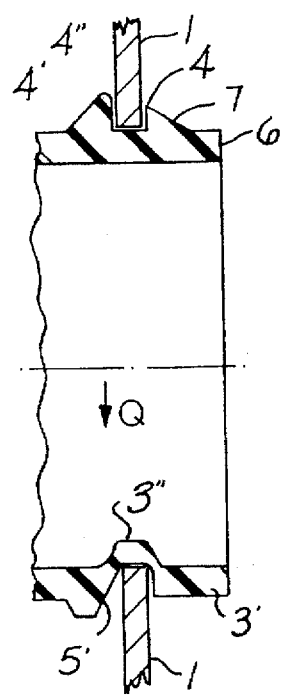
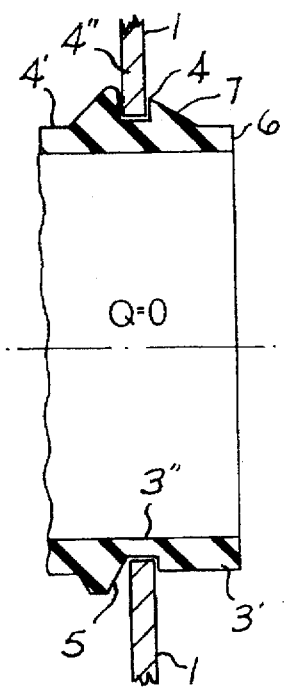
FIG. 1   FIG. 2   FIG. 3
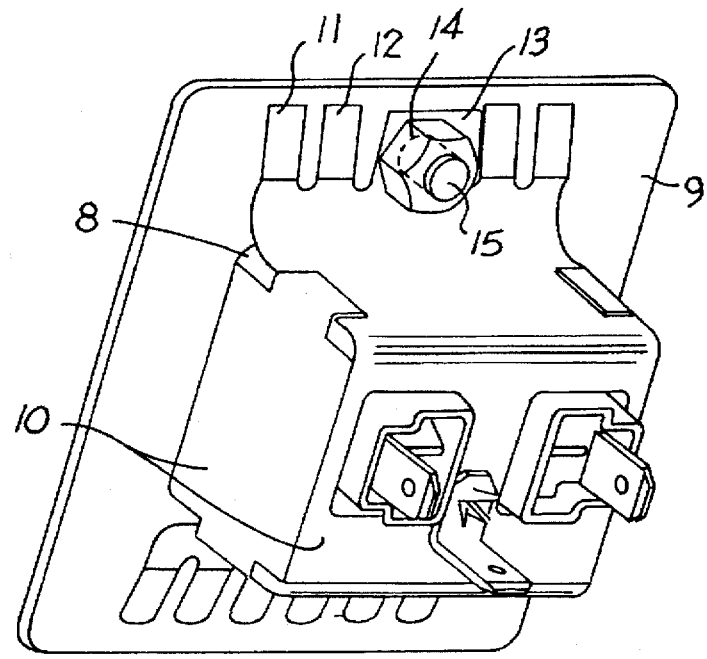
FIG. 4

ELECTROTECHNICAL ARTICLE

BACKGROUND OF THE INVENTION

1. Field of the Invention

The present invention relates to an electrical module which is suitable for a plugged mounting from an inner side of an apparatus into a correspondingly dimensioned opening in a front surface of an apparatus, specifically a module with e.g. plugs, switches and similar, which electrical module includes a casing consisting preferably of a plastic material and having, seen in the direction of the plugged-in state, a front end; which casing has at an outer side at the front end a latching mechanism for the plugged mounting, and which casing includes, furthermore, front edges and which opening is bordered by further edges.

2. Description of the Prior Art

Until a short time ago electrical module were mounted in correspondingly dimensioned openings in walls of apparatuses in that an article was always slid from the outer side of the apparatus into the opening. As a rule, the article had to be fastened to the wall of the apparatus by means of mounting members such as rivets or threaded bolts or possibly by snap-on mounting connections located at the rear side seen in the plug-in direction. A preceding wiring of the electrical connectors to the inner side of the apparatus actually possible (directly in front of the opening), necessitated, however, needlessly lengthened conduit wires and accordingly additional space in the apparatus. A further drawback was that the openings in the wall of the casing had to correspond to the largest cross-section of the article at the inner side of the apparatus.

This led to the basic idea to insert the articles by a plug-in mounting from behind into the openings of the wall of the casing. This allows the articles to be at their back side larger than at the front portions which are to be inserted into the openings, or the placing of larger components at the rear side. A wiring of the connections can obviously proceed in advance behind the wall of the apparatus. Due to the plug-in mounting the time for assembling will be minimal.

This idea of the plug-in mounting proceeding from the inner side of the apparatus lacked until now a simple reliable latching mechanism which ensures an impeccable locking and is not visible from the outside as such in order to prevent the final user from releasing it.

SUMMARY OF THE INVENTION

A general object of the present invention is, therefore, to design the casing of an electrical module in such a manner, that the earlier shortcomings of the plug-in mounting, specifically from the back side of a wall of a casing may be overcome.

A further object is to provide an electrical modules in which the latching mechanism has two grooves located at outer sides of two oppositely located casing walls and extending parallel to the front edges of the casing, which grooves have bottoms which are adapted to abut in the mounted state of the article the further edges of the openings and are located at a distance from each other which corresponds to the width of the wall openings. One of which grooves includes a elastically yielding rear wall slanted backwards and serving as abutment, and of which the bottom is structured as a spring adapted to elastically yield when subjected to outer forces by a distance which is at least as large as the depth of the other groove.

Due to the specific design of the latching mechanism, with a groove formed at the outer side of the casing as a centering groove with an elastically yielding bottom and another groove placed at the oppositely located outer side of the casing and which forms the latching element proper. The article is initially held when it is set in, in a precentered manner in the opening in the wall of the apparatus, thereafter the article is pressed by means of a lateral movement in a direction towards the elastic bottom of the groove and pivoted in the pressed-in state or during the pressing-in until the other groove is located oppositely the corresponding edge of the opening by a pivoting movement if necessary until an abutting of the other groove at the wall of the apparatus. By the releasing of the lateral force the article is finally brought due to the spring-elastic force into its final position with both grooves engaging the opening in the wall.

A dismounting of the mounted article is possible by an aimed lateral movement in direction towards the elastic bottom of the groove, followed by a pivoting movement without the danger of breaking the mechanism. An unintended detaching of the article is, however, as a rule not possible when used properly in the intended way.

Still a further object is to provide an article, in which at least the bottom of one of the grooves forms part of the overall rigid casing but is structured elastically relative to the casing.

Yet a further object is to provide an article in which the bottom of the groove forming part of the casing or groove, which, is rigid in its entirety, comprises, however a spring elastic seat forming an abutment adapted to contact an edge of the opening, which seat is a rubber elastic insert or a leaf spring element, which seat forms the active bottom of the groove and is structured to elastically yield inwards by a distance which is at least as large as the depth of the other groove.

A further object is to provide an article in which the other groove includes a rear wall which is superelevated and forms an abutment adapted to abut the inner side of the front surface of the casing.

Still a further object is to provide an article in which at least parts of the portion of the wall of the casing extending between the other groove and the corresponding front edge of the casing is structured at its outer side as a ramp.

Yet a further object is to provide an article in which in the region of the rear wall of the groove with the bottom structured as a spring, two laterally located elastically yielding tongues with abutments are formed thereupon to form locking cams which after a snapping of the article into the opening in the wall come to lie directly over the corresponding edge of the opening and lock the inserted article in its mounted state.

A further object is to provide an article which has a protective casing of a electrically conducting material having along at least one foot edge a plurality of contact fingers which are located to come into contact with a grounding conduit plate, whereby at least one of the contact fingers includes an opening for inserting a mounting screwbolt therethrough.

BRIEF DESCRIPTION OF THE DRAWINGS

The invention will be better understood and objects other than those set forth above, will become apparent when consideration is given to the following detailed description thereof. Such description makes reference to the annexed drawings, wherein:

FIG. 1 illustrates a section, only schematically, through a part of an article casing structured in accordance with the invention in a pre-mounted position;

FIG. 2 illustrates the article casing of FIG. 1 in the position where the bottom of the groove is pressed in;

FIG. 3 illustrates the article casing of FIG. 1 in the snapped in position where the bottom of the groove has returned elastically into the initial position;

FIG. 4 illustrates an article having a protective cover inserted into an opening of a casing wall.

DESCRIPTION OF THE PREFERRED EMBODIMENTS

Figure 5D:
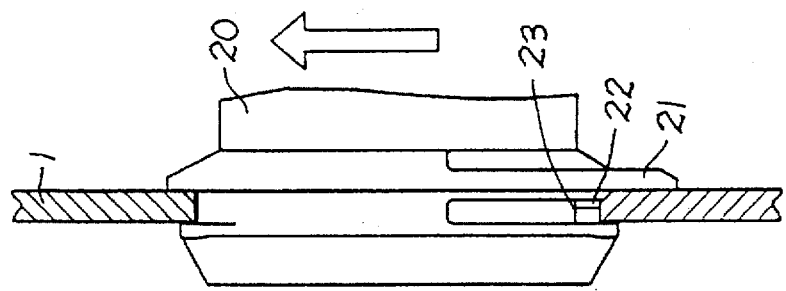
FIGS. 5A–5D illustrate merely schematically an article having a latching cam which operates during the mounting.

FIGS. 1 to 3 of the drawing illustrate a wall 1 of a casing of an apparatus having an opening 2 into which the front end of an electrical module with a plug, a socket, switch or a combination of these elements adapted for a plug-in mounting technique, preferably from the inner side of the apparatus.

The hereinbefore described mechanism includes two grooves 3 and 4, resp., at the outer side of two opposite walls 3',4' of the article. The bottoms of the grooves 3,4 forming abutments for the edges of the opening are located at a distance from each other which corresponds roughly to somewhat less than the width of the opening 2. One groove 3 of the grooves which acts as a centering groove comprises a back wall 5 slanted backwards and acting as abutment. In relation to the outer wall 3' of the article this back wall can or can not be superelevated. Except for the slanted back wall the grooves 3,4 have a substantially rectangular cross-section, whereby the width of the grooves is somewhat larger than the thickness of the wall of the casing 1 of the apparatus to provide a small clearance.

The bottom section 3" of the groove 3 is structured to be spring like and elastically yielding relative to the rigid wall 3' of the article such that it can move elastically inwards when exposed to outer forces illustrated as lateral force Q on the article against the wall of the casing of the apparatus in FIG. 2. Accordingly, if the article is in the pressed-in state it can be brought by a pivoting (arrow V) into the position according to FIG. 2, whereby the article will come to contact the wall 1 with a superelevation of the back wall 4" of the groove 4 acting as abutment stop. Now, the groove 4 is located directly opposite of the corresponding edge of the opening 2 (FIG. 2). By a releasing of the lateral force Q the article will be brought under the influence of the spring force of the bottom section 3" on its own into the final position illustrated in FIG. 3 where both grooves 3,4 engage the wall 1 which surrounds the opening 2.

Instead of designing the bottom 3" of the groove to be elastic relative to the wall 3 of the article, quite obviously the portion of the rigid wall 3' which contains the groove 3 could be structured elastic relative to the wall 3'.

It also can be envisaged to design the groove 3 in the wall 3' to be rigid, but to place a spring elastically yielding support (e.g. a rubber elastic insert or a leaf spring element) on the rigid bottom of the groove, which in such case will form the acting elastically yielding bottom of the groove.

In the portion of the wall between the groove 4 and the corresponding edge 6 of the casing, ramps 7 could be foreseen at least at certain areas (preferably the ramp extends along the entire length of the groove 4). This facultative ramp 7 could be utilized for producing the lateral force Q upon the pivoting of the article.

The structure of this invention necessitates a minimal time for assembling and, therefore, low assembling costs. At the back side, the article can be larger that at the side of the mounting, i.e. arbitrary components can be mounted at its back side. All connections can be wired prior to the assembling and an impeccable mounting support is ensured. By an inwards directed elastic movement of the bottom portion 3" of the groove the article can be removed with out the danger of injuring the supporting and latching mechanism with slight pressure corresponding to lateral force Q, followed by pivoting movement.

When mounting from the inner side, the article features a high loading capacity from the rear and also from the front side. A possible oblique pulling force acting on connecting cables will be taken up by the latching element.

When subjected to a loading action from the front side, an outwards directed torque is generated in the latching element and the element will wedge itself in the mounting opening.

FIG. 4 illustrates an electrical module 8 which is set from the rear into a mounting opening of a wall 9 of an apparatus and which is surrounded by a protective casing made of an electronically conducting material. Preferably elastically yielding contact fingers 11,12,13, etc. are foreseen along two foot edges of the protective casing which contact fingers project outwards. Thereby, at least the contact finger 13 includes an opening 14 (here a through bore) through which a threaded mounting bolt 15 may be inserted in order to ensure a contact with a grounding plate, here the wall 9 of the casing. Any possible components of the article which are to be connected to ground are in connection with the protective casing 10.

Figure 5C:
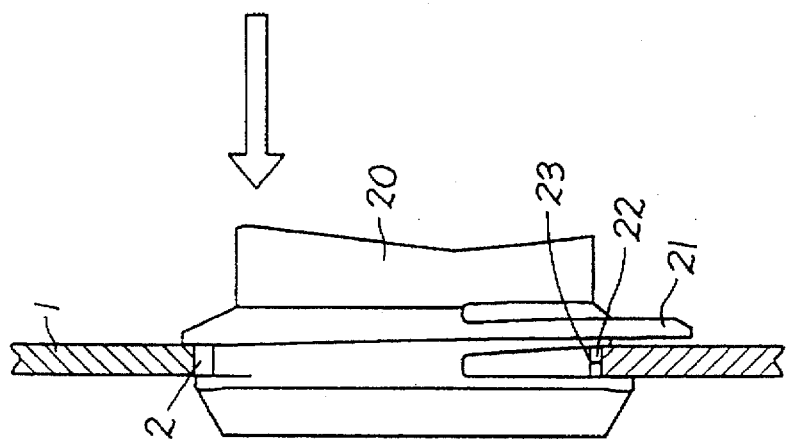
Figure 5B:
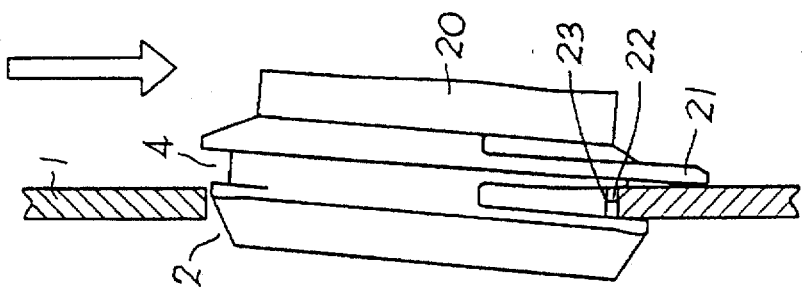
Figure 5A:
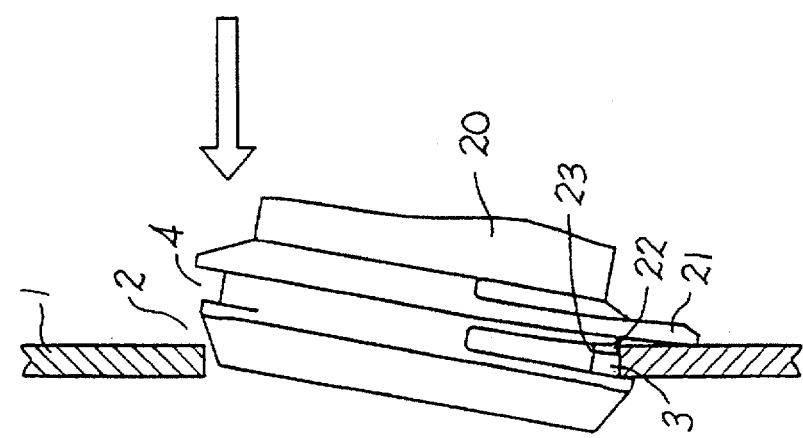

FIG. 5 illustrates purely schematically the mounting of a module with a locking in the opening 2 of a casing wall 1.

The module 20 includes grooves 3 and 4 (Such as in FIGS. 1–3), additionally, however, also two lateral leaf springs 21 (only one is illustrated). An abutment cam 22 is formed on both leafs 21 which ensures the safe locking of the snapped-in article 20 in its mounted state. In contrast to the bottom 23 of the groove 3 the leaf springs 21 can yield elastically only sideways such to allow the mounting. The cams 22 prevent an unlocking of the mounted article (see FIG. 5). A possibly desired unlocking needs an auxiliary tool (not illustrated) which firstly must lift the leafs 21 and therewith the cams 22 out of the opening 2 before the article can be released by a pressure acting onto the elastically yielding wall portion of the bottom 23 of the groove.

The distance between the bottom of the groove 4 and the active surface of the locking cams 22 is only somewhat smaller that the width of the opening 2 of the wall of the casing.

In case of a loading from any possible direction coming from the front side the locking cams 22 prevent a displacing of the article in the opening, such that the elastic portion of the bottom of the groove 3 is not loaded and thus can not yield elastically inwards.

While there are shown and described present preferred embodiments of the invention, it is to be distinctly understood that the invention is not limited thereto, but may be otherwise variously embodied and practiced within the scope of the following claims.

We claim:

1. An electrical receptacle module for carrying electrical components adapted to be mounted into an opening of predetermined dimensions in a panel defined in a wall of an electrical apparatus, comprising in combination:

a rigid module casing defining two mounting grooves of predetermined depth located on opposite sides of the module at a distance from each other corresponding to fit within the predetermined dimensions of the opening with groove bottoms substantially abutting panel edges defining the opening and further defining rigid groove walls for abutting opposite sides of the panel about the opening;

said groove walls further defining a first groove wall surface for contacting one wall side of the panel, said groove wall surface being provided with mounting structure adapted to pass through the opening to register the grooves upon the panel edge about the opening on said one side of the panel;

a second groove wall adapted to abut an opposite wall side of the panel without passing through the opening for retaining the module in place in the opening in a stable mounted state with the first groove walls abutting the panel; and "one of said groove bottoms that substantially abuts the panel edge being an elastically yielding structure that yields enough to allow movement of the module", a distance corresponding to the groove depth, thereby permitting the first groove wall to pass through the opening when the module is moved laterally toward a panel edge to seat the module in said opening in a stable mounted state with the grooves abutting the edges of the opening thus to retain the module in place in said panel opening.

2. The module of claim 1, in which the elastically yielding structure is the bottom of said first groove and part of the rigid casing.

3. The module of claim 1, in which the second groove includes a rigid rear wall which is superelevated to form an abutment.

4. The module of claim 1, in which at least parts of the portion of an abutting groove wall of the module is structured as a ramp to permit the first groove wall to pass through said opening.

5. The module of claim 1 further comprising groove wall structure comprising a spring with two laterally located elastically yielding tongues having abutments formed thereupon forming locking cams for locking the module in its stable mounted state.

6. The module of claim 1 wherein said panel comprises a grounded electrical plate further comprising a surrounding protective casing of an electrically conducting material about said module having positioned alongside the panel a plurality of contact fingers structured to come into contact therewith, in which at least one of the contact fingers includes an opening for inserting a mounting screwbolt therethrough into said panel.

\* \* \* \* \*